「19」 United States Patent
Houvener et al.

[11] Patent Number: 6,070,141
[45] Date of Patent: May 30, 2000

[54] SYSTEM AND METHOD OF ASSESSING THE QUALITY OF AN IDENTIFICATION TRANSACTION USING AN IDENTIFICAION QUALITY SCORE

[75] Inventors: Robert C. Houvener, Nashua; Ian P. Hoenisch, Salem, both of N.H.

[73] Assignee: Image Data, LLC, Nashua, N.H.

[21] Appl. No.: 09/124,149

[22] Filed: Jul. 28, 1998

Related U.S. Application Data

[63] Continuation-in-part of application No. 08/684,677, Jul. 19, 1996, Pat. No. 5,790,674, which is a continuation-in-part of application No. 08/436,146, May 8, 1995, Pat. No. 5,657,389.

[51] Int. Cl.[7] .............................. G06F 17/60; C06K 5/00
[52] U.S. Cl. ................................ 705/1; 705/44; 705/18; 705/39; 705/41; 705/76; 235/380
[58] Field of Search .................................. 705/16, 18, 39, 705/41, 44, 45, 1, 76; 235/380

[56] References Cited

U.S. PATENT DOCUMENTS

| | | | |
|---|---|---|---|
| 3,569,619 | 3/1971 | Simjian | 235/380 |
| 3,711,833 | 1/1973 | Starkey | 340/825.34 |
| 4,023,013 | 5/1977 | Kinker | 235/379 |
| 4,156,911 | 5/1979 | Crane et al. | 382/121 |
| 4,672,377 | 6/1987 | Murphy et al. | 340/825.34 |
| 4,858,121 | 8/1989 | Barber et al. | 705/2 |
| 4,991,205 | 2/1991 | Lemelson | 380/5 |
| 4,993,068 | 2/1991 | Piosenka et al. | 380/23 |
| 4,995,081 | 2/1991 | Leighton et al. | 380/23 |
| 5,053,608 | 10/1991 | Senanayake | 235/380 |
| 5,056,141 | 10/1991 | Dyke | 380/25 |
| 5,095,196 | 3/1992 | Miyata | 235/382 |
| 5,131,038 | 7/1992 | Puhl et al. | 380/23 |
| 5,180,901 | 1/1993 | Hiramatsu | 235/380 |
| 5,224,173 | 6/1993 | Kuhns et al. | 382/116 |
| 5,259,025 | 11/1993 | Monroe et al. | 380/23 |
| 5,305,196 | 4/1994 | Deaton et al. | 705/10 |
| 5,321,751 | 6/1994 | Ray et al. | 380/23 |
| 5,337,358 | 8/1994 | Axelrod et al. | 380/23 |
| 5,367,572 | 11/1994 | Weiss | 380/23 |
| 5,416,306 | 5/1995 | Imahata | 235/380 |
| 5,436,970 | 7/1995 | Ray et al. | 380/23 |
| 5,466,918 | 11/1995 | Ray et al. | 235/380 |
| 5,602,933 | 2/1997 | Blackwell et al. | 382/116 |
| 5,613,012 | 3/1997 | Hoffman et al. | 382/115 |
| 5,648,648 | 7/1997 | Chou et al. | 235/382 |
| 5,657,389 | 8/1997 | Houvener | 380/23 |
| 5,679,938 | 10/1997 | Templeton et al. | 235/379 |
| 5,790,674 | 8/1998 | Houvener et al. | 380/23 |
| 5,832,464 | 11/1998 | Houvener et al. | 705/45 |
| 5,903,225 | 5/1999 | Schmitt et al. | 340/825.31 |
| 5,965,859 | 10/1999 | DiVincenzo et al. | 235/380 |

*Primary Examiner*—James P. Trammell
*Assistant Examiner*—Nicholas David Rosen
*Attorney, Agent, or Firm*—Bourque & Associates, P.A.

[57] ABSTRACT

A system and method of assessing the quality of an identification transaction is disclosed. The method includes the following steps: registering a plurality of persons to be identified by providing at least two identification information (ID) units corresponding to each person and storing the ID units in an identification database; assigning an identification quality score to each ID unit; presenting a first ID unit to initiate a transaction where identification is desired; inputting the first ID unit into a point of identification (POI) terminal; establishing a communications link between the POI terminal and the identification database; transmitting the first ID unit to the identification database; searching the identification database and retrieving at least one second ID unit stored in the identification database along with the identification quality score(s) assigned to the retrieved second ID unit(s); transmitting the second ID unit(s) to the POI terminal; displaying the second ID unit(s) and their associated identification quality score(s) on a POI terminal display; comparing the displayed second ID unit with a corresponding second ID unit physically presented by the person being identified; acknowledging a match by entering a command into the POI terminal; storing first, second ID units and transaction information as a transaction record; and adjusting identification quality scores based on historical data.

22 Claims, 7 Drawing Sheets

SYSTEM AND METHOD OF ASSESSING THE QUALITY OF AN IDENTIFICATION TRANSACTION USING AN IDENTIFICAION QUALITY SCORE

RELATED APPLICATION

This is a Continuation-in-Part of application Ser. No. 08/684,677 filed Jul. 19, 1996, now U.S. Pat. No. 5,790,674 which is a Continuation-in-Part of application Ser. No. 08/436,146, filed May 8, 1995, now U.S. Pat. No. 5,657,389, issued Aug. 12, 1997.

FIELD OF THE INVENTION

The present invention relates to the field of identity verification. Specifically, the invention is directed to a system and method of assessing the quality of an identification transaction. The system and method utilizes a remote database including an identification quality score database, wherein an identification quality score is maintained for each user of the system. While the system and method will be described herein with respect to non cash-based financial transactions, such as credit card and check-based financial transactions, it should be understood that the invention is applicable to any situation where the possibility for identity-based fraud exists, such as banking transactions, welfare distributions, voting, firearms sales, health care, airline tickets, immigration and naturalization, and other law enforcement situations.

BACKGROUND OF THE INVENTION

Positive identity verification is critical in many types of transactions and security procedures. For example, signatures, fingerprints or images of faces are compared to establish identity. Creation of fraudulent identities or the misrepresentation of an individual's identity can result in fraudulent transactions and the breach of security systems. At present, such positive identification means as driver's licenses, picture identification cards, hand-written signatures, personal identification numbers, fingerprints, retinal scans, voice prints and other ways of uniquely identifying personal characteristics are used. However, these prior art methods of identity verification exhibit one or more of the following deficiencies: 1) they do not offer sufficient reliability for most positive personal identification applications; 2) the technology required for their implementation is too expensive for wholesale adoption by entire industries; 3) they do not offer ease of use, which is critical for most applications of personal identification; 4) the technology required to implement them in a wide-scale manner is not yet mature enough to guarantee sufficient reliability; 5) the recurring cost of using technology is too high for most applications of personal identification; 6) the data used for identity verification is not maintained in a secure manner and is almost universally held by the person presenting it as the form of verification, thereby allowing for fraudulent alteration of the verification data; 7) processes for building accurate verification databases for wide-spread use are impractical; and 8) the process of verification does not include sufficient steps to ensure that the individual responsible for identity verification is accountable to ensure that identity verification is accurately performed.

One class of situations where positive identification is essential involves non cash-based financial transactions, including credit/debit card and check-based financial transactions. Credit cards are an increasingly popular means for consumers to complete transactions. However, part of the costs incurred for the convenience of using credit cards is the burgeoning growth of credit card fraud. Because there are trillions of dollars of credit card transactions made each year, which depend on the fact that the person presenting the form of payment is actually the person having the legal right to use the underlying account, even a small percentage of fraudulent transactions results in billions of lost dollars. The cost of this fraud is paid for, indirectly, by consumers in the form of higher credit card interest rates and fees and, in part, by merchants accepting such credit cards in the form of higher transaction commissions. Check fraud is also a significant problem faced by consumers and financial institutions.

Methods used to combat fraud have been the use of holographic images on credit cards, the need for a validation requester to obtain transaction approval, the encoding of cardholder information on magnetic strips on the back of the card, as well as signature verification. A number of patents have issued on identification devices and methods. Of particular note is U.S. Pat. No. 5,321,751, issued to Ray, et al. on Jun. 14, 1994. Other prior art references of note are U.S. Pat. No. 5,337,358, issued to Axelrod, et al. on Aug. 9, 1994, U.S. Pat. No. 5,095,196, issued to Miyata on Mar. 10, 1992, U.S. Pat. No. 5,259,025, issued to Monroe, et al. on Nov. 2, 1993, U.S. Pat. No. 4,995,081, issued to Leighton, et al. on Feb. 19, 1991, U.S. Pat. No. 4,991,205, issued to Lemelson on Feb. 5, 1991, U.S. Pat. No. 5,053,608, issued to Senanayake on Oct. 1, 1991, U.S. Pat. No. 5,131,038, issued to Puhl, et al. on Jul. 14, 1992 and U.S. Pat. No. 4,993,068, issued to Piosenka, et al. on Feb. 12, 1991. As noted above, one of the underlying deficiencies of all of these prior art identification systems is that they all rely, in some manner, on information encoded on the credit card being presented. While some of these references include sophisticated encryption algorithms, the fact remains that giving access to the information to the card users lends itself to the potential for reverse engineering and overcoming even the most sophisticated of encryption means.

In recent past, Citibank introduced a credit card with a digital likeness of the authorized user provided on the card itself. As the Ray patent discloses, the photographic image on the Citibank card resulted in an initial drop in fraud in the New York test market estimated as high as 67 percent. However, as Ray also explains, the Citibank photo card system, like other forms of identity verification that are distributed to the public, will eventually be defeated by sophisticated counterfeiting.

An additional difficulty with most prior art verification methods is that they all require the use of a special credit card incorporating some form of identification means. Thus, in order for their use to gain widespread acceptance, replacement of existing credit cards and credit manufacturing equipment must be accomplished.

On Aug. 12, 1997, the assignee of the present invention was granted U.S. Pat. No. 5,657,389, which discloses a significant advance in positive identification systems and methods and which is fully incorporated herein by reference. This system and method segregates the identification medium from the credit card or the like, in an attempt to curb the likelihood of fraudulent transactions. However, even the sophisticated, distributed positive identification system and method taught in the '389 Patent could be overcome by fraudulent system registrations, where criminals manufacture identities and either fraudulently register these identities in association with credit card accounts owned by others or obtain separate accounts associated with their fraudulent identities. In these situations, even one or two fraudulent transactions perpetrated on a fraudulent account, when combined with the ability to obtain a number of such fraudulent identities and account associations, can result in significant identity-based fraud losses.

Accordingly, the disclosed invention offers a system and method of assessing the quality of a particular identification transaction, which is aimed at identifying transactions where heightened scrutiny should be instituted. Conversely, the disclosed system and method also identifies those identification transactions where there is little or no possibility that a identity-based fraud is occurring.

SUMMARY OF THE INVENTION

The present invention provides a system and method of assessing the quality of an identification transaction. The method comprises registering a plurality of persons to be identified by providing at least two identification units corresponding to each person and storing the identification units in an identification database. When persons to be identified are initially registered, an identification quality score is assigned to each person. When a registered person initiates a transaction where positive identification of that person is desired, the person will present a first identification unit at a point of identification. The first identification unit will be accepted and input into a point of identification terminal. The point of identification terminal will then establish a communications link between the point of identification terminal and the identification database. Next, the point of identification terminal will transmit the first identification unit to the identification database. The identification database will then be searched and at least a second of the identification units stored in the identification database will be retrieved along with the identification quality score assigned to the person corresponding to the received first identification information unit. The second identification information unit and the identification quality score or a derivative thereof are then transmitted to the point of identification terminal over the communications link.

The second identification information unit and the identification quality score or derivative are then displayed on a display device at the point of identification terminal. The person responsible for the positive identification of the person initiating the transaction will then compare the displayed identification unit with a corresponding identification unit physically presented by the person being identified at the point of identification terminal. In an alternative embodiment, an automated biometric matching system may be used, such as a fingerprint or retinal image comparison system.

If a match exists between the displayed identification information unit and the corresponding identification information unit physically presented by the person being identified, the person tasked with the identification process will acknowledge the same by entering a command into the point of identification terminal. The first and second identification information units along with relevant transaction information will be stored at the remote database site as a transaction record. Finally, the identification quality score stored at the remote database site will be adjusted based on historical data acquired and stored at the remote database site.

DESCRIPTION OF THE DRAWINGS

These and other features and advantages of the present invention will be better understood by reading the following detailed description, taken together with the drawings wherein:

FIG. 2 is a perspective view of the preferred embodiment of the point of identification terminal, which would be available for use at a point of sale or the like;

DETAILED DESCRIPTION OF THE PREFERRED EMBODIMENT

Figure 1:
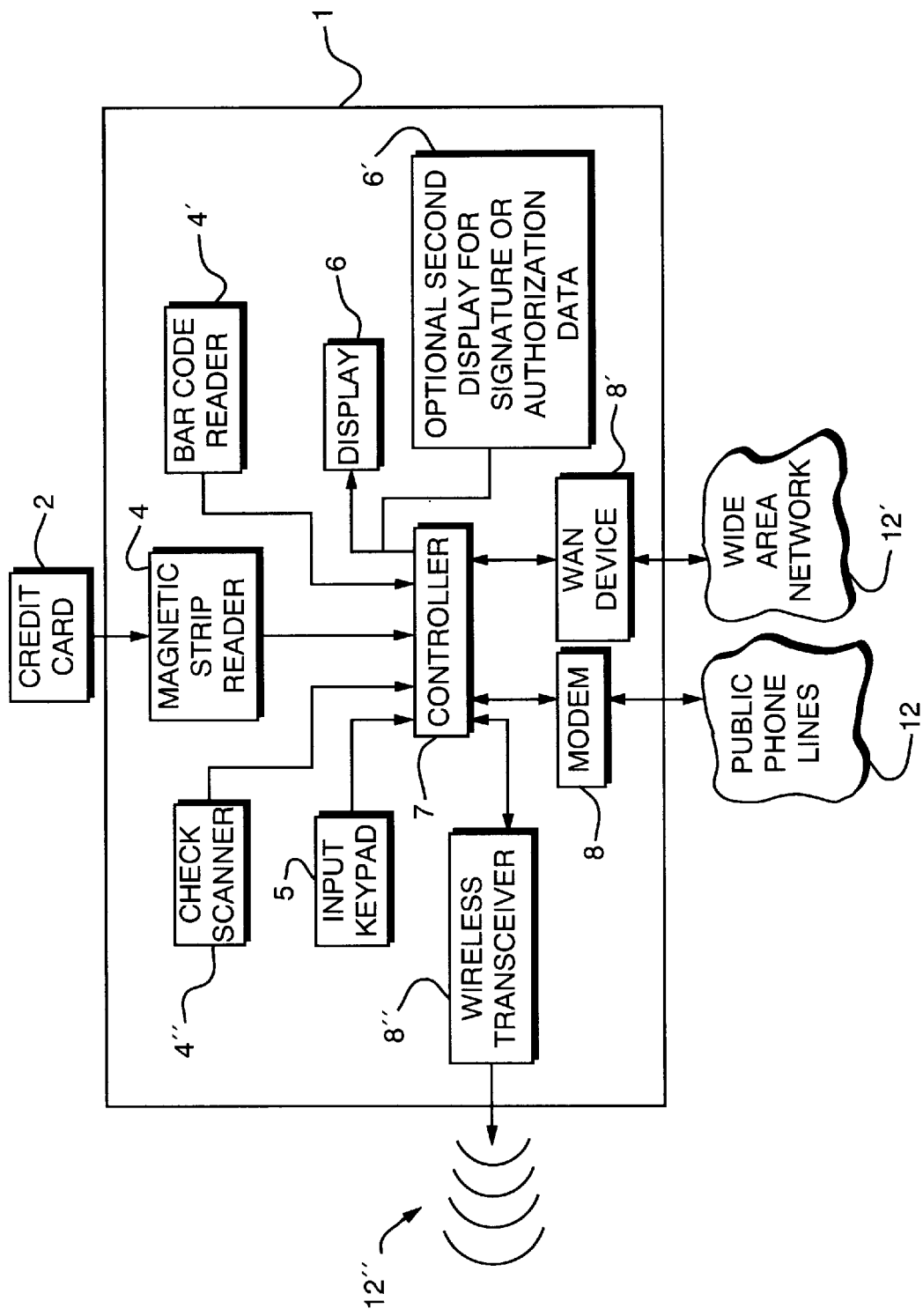
FIG. 1 is a block diagram of a point of identification terminal showing the various components contained therein.
Figure 2:
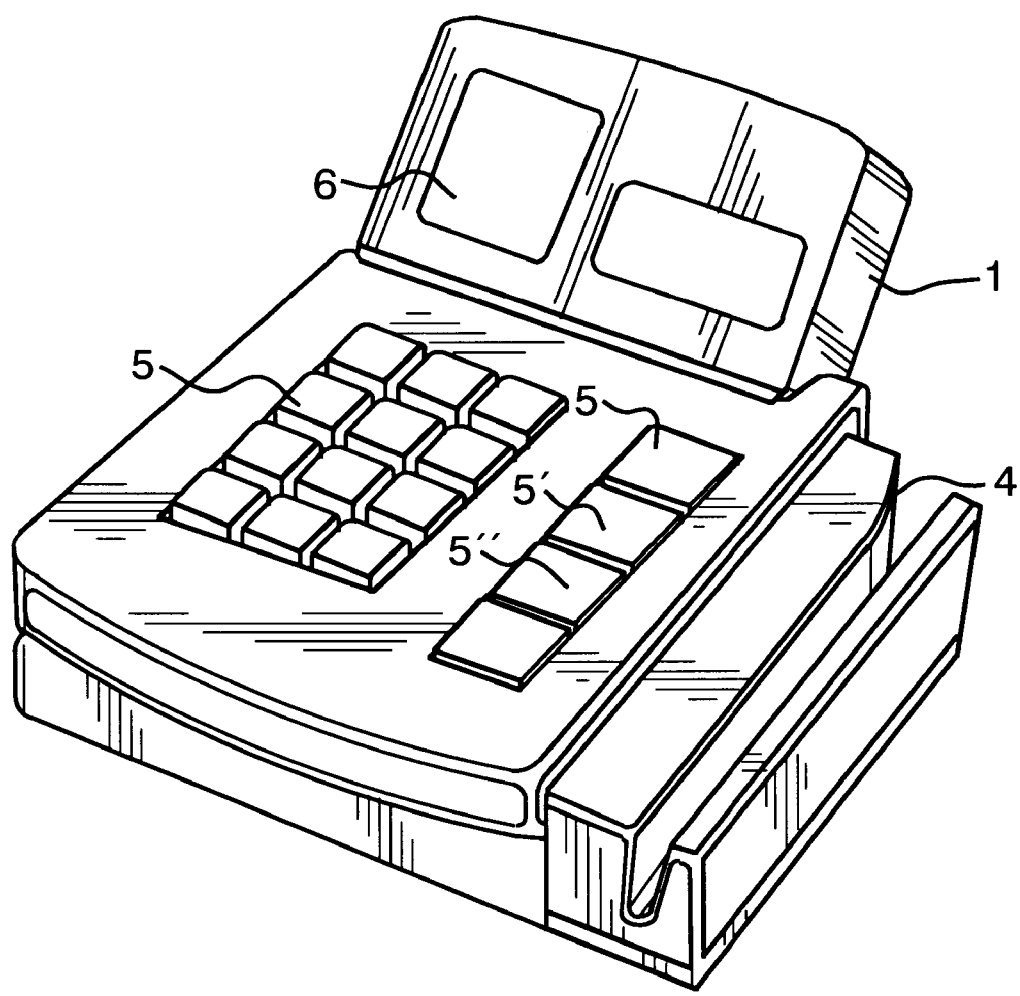
Figure 3:
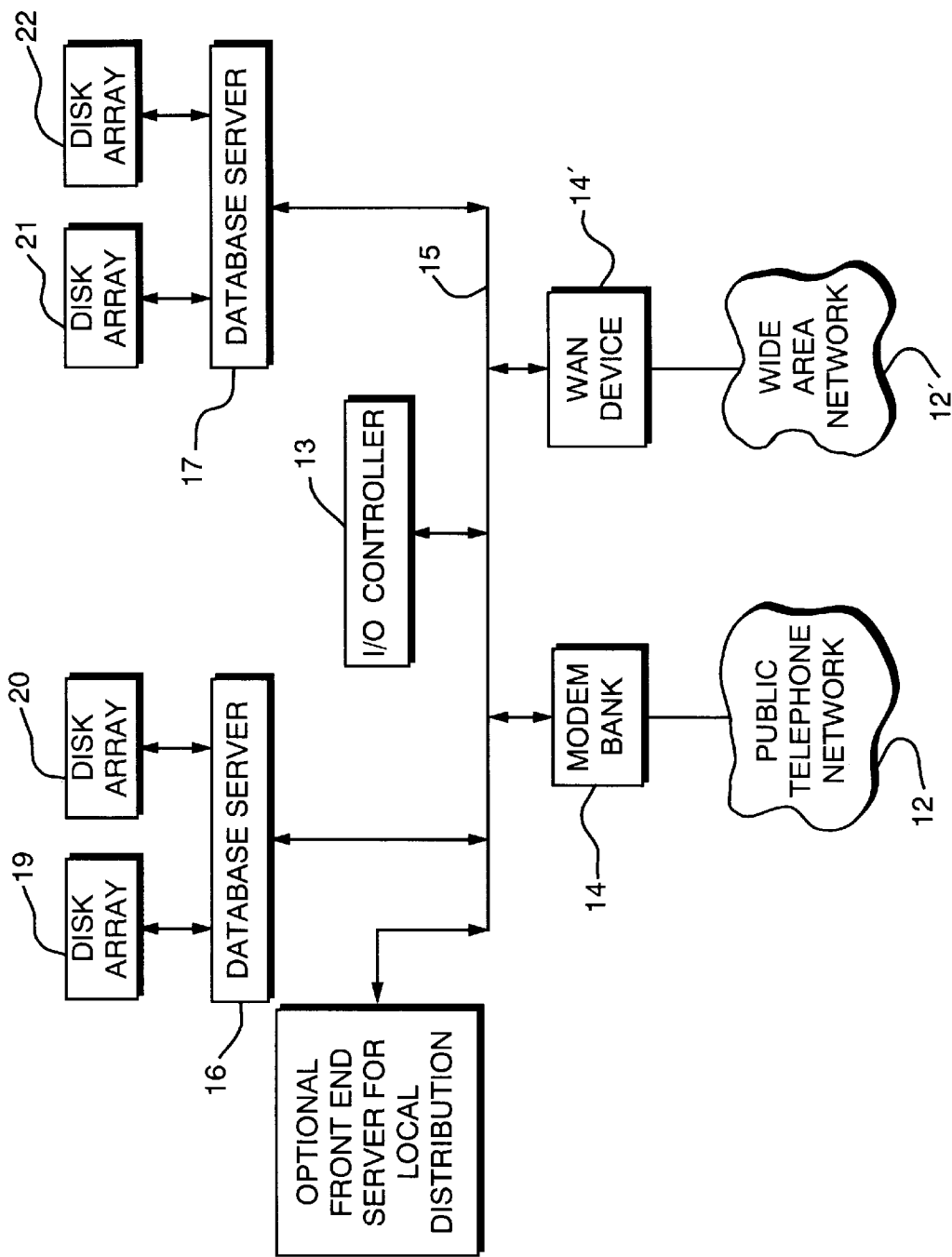
FIG. 3 is a block diagram of components of a positive identification system and the communication flowpath established between the point of identity verification and the remote database storage and retrieval center, which is where a comprehensive database of photographic images of persons to be identified is maintained and accessed for transmission to the point of identification.

The present invention provides a system and method of assessing the quality of an identification transaction, which is used in conjunction with a system and method of developing, maintaining and using a secure and authentic database of digital photographic images, signatures or other data unique to individuals for positive identification purposes, such as the system disclosed in U.S. Pat. No. 5,657,389, which is commonly owned by the assignee of the present invention and is fully incorporated herein by reference.

The system includes a means for accessing the database in a secure and cost-effective manner, a means for performing positive identification transactions including a means of assessing the quality of the identification transactions, and a distributed database update and retrieval system, which allows for low cost operation, ease of use, stability and robustness for vast numbers of verification requests originating from worldwide locations.

The identification quality score of the present invention is used to rate identification transactions, based on historical data acquired and maintained at the remote database site, which assists individuals tasked with identification duties in rapidly identifying those identification transactions where heightened scrutiny should be applied either because there is an increased risk of the perpetration of identity-based fraud or the particular person being positively identified is a relatively new registrant with the system and has not yet established an identification history.

The system will be disclosed herein with particular references to a point of sale system, where a credit card or other non cash-based financial instrument, such as a personal check, is presented by a consumer, or presenter, in order to make a purchase. Thus, the disclosure will make particular references to credit card accounts, checking account numbers, and the like.

However, it is understood that the system and method disclosed herein is adaptable to any application where positive identification of a person is required. Such alternative applications comprise other banking transactions, firearms sales, food stamp reimbursement and a host of other applications related to the welfare, voting, law enforcement, health care, airline, immigration and naturalization fields, which will be discussed in more general terms below.

Referring now to the figures, a positive identification system in accordance with the disclosed invention is shown. A point of identification terminal 1 is located at a point of identification, namely, a location where the identity of persons present is required to be verified. The point of identification terminal comprises a standard magnetic strip reader 4, an optional bar code reader 4', a check scanner 4", all of which are well known in the art, an input keypad 5, a display 6, which is preferably a miniature flat panel display, a controller 7, and an internal communication modem or other communication means 8.

Although the rate of data exchange may vary depending on the availability of quality phone lines or other means of data transmission, such as a dedicated wide area network, a satellite communication link or other wireless communications link, such as analog or digital cellular telephone communications, the system would preferably transmit data at a rate of at least 1,200 baud per second (bps). However, quality data transmission media will allow for the data exchange at rates of 9,600 bps 14,400 bps, 28,800 bps or even higher baud rates.

In credit card transactional situation, the point of identification would be the point of sale, which typically incorporates a cash register and prior art credit card verification systems. Upon presentation of a standard credit card 2, the store clerk or other individual responsible for positive identification would input the credit card account number into the point of identification terminal 1. The preferred method of inputting the credit card information would be by swiping the credit card through the standard magnetic strip reader 4. The magnetic strip reader 4 would read credit card account information, which is currently encoded on magnetic strips on the reverse side of virtually all credit cards. In the alternative, if the magnetic strip containing the account data is corrupted, which routinely occurs due to either wear or contact with a powerful magnetic field, the identifier would simply read the account number off of the credit card, where it is typically provided in embossed or printed characters, and input the credit card account number into the point of identification terminal using keypad 5. Another alternate means of inputting the credit card account information into the point of verification terminal would be to utilize a coded medium such as a bar code. In this embodiment, the magnetic strip reader 4 would be replaced by a standard bar code reader to transfer its data to the code reader 4' and onto controller 7.

Another embodiment of the invention would include check scanner 4", which would be used to scan checking account number information off a standard personal or company check, which would expand the role of the system from credit/debit card transaction identity verification to checking related transactions as well.

In addition to the credit card or checking account information, the identifier could manually input any other information needed to aide in the identity verification process via keypad 5. Such additional information could be whether the presenter is male or female, in which case the keypad could incorporate a specific key to correspond to the male—female choice 5' or whether the presenter is a dependent of the credit card owner, in which case the keypad would incorporate a specific key 5" to correspond to dependent choice. Alternatively, a simple scroll key could be included to allow an identifier to simply scroll through all of the authorized users of a particular account.

Once the account number is entered into the point of identification terminal 3, the terminal initiates communications via its internal communication means, which may include a modem 8, wide area network (WAN) device 8', a wireless communications transceiver 8" or the like to one of a number of remote database storage sites 9–11. Acceptable forms of communications links include public phone lines 12, dedicated network means 12' or wireless communications links 12" such as analog or digital cellular telephone systems or satellite communications links. The actual site accessed would be a function of availability and loading on the public access phone lines, network availability, retrieval site availability or other system availability criteria at the time the terminal initiates communication with a remote database site.

Communications are then established with an input/output controller 13 at the remote database storage site through a modem bank 14 at the database storage site, the controller 13 then initiates a query to the point of identification terminal 3 to verify that the terminal has the appropriate authority to access the remote database site and is a valid device. One simple and cost effective method of performing this query is to use commonly available caller ID technology to ensure that the request for data has originated from an authorized telephone line. Additionally, a software key may be incorporated into each point of identification terminal which will respond in a predetermined manner when queried by a remote database storage site.

Once controller 13 verifies that the requesting point of identification terminal 1 is a valid device and has the appropriate access privilege, the terminal will be allowed to transmit an information request, which includes the account number input into the point of identification terminal, to the remote database storage site. The information request is also received by input/output controller 13, over a high speed network 15. The high speed network may be fiber distributed data interface (FDDI), asynchronous transfer mode (ATM) or any other suitable cost effective high speed network. The information request is then routed to one of a number of database servers 16–17 where the credit card account data is processed.

The selected server then accesses a set of high speed, high reliability disk arrays 19–22 and retrieves the digital photographic image(s), biometric or other unique identification information associated with the account information included in the information request received by the database server.

Also maintained at the remote database site, in disk arrays 19–22, is an identification quality score database. This database maintains identification quality scores, which score identities and account numbers in terms of the probability that they are susceptible to identity-based fraud. As can be appreciated, even a highly sophisticated positive identification system can be susceptible to identity-based fraud. For example, those identification documents required to enroll is such systems, including drivers' licenses, social security cards, military identification cards, birth certificates and the like, are themselves susceptible to forgery. If a forged document were used by a criminal to pass him or herself off as an authorized user of an account, then that criminal would be in a position to perpetrate at least one fraudulent transaction on any given account before the fraud can be identified.

Thus, there is a need to identify those transactions where a heightened level of scrutiny should be utilized by those system users tasked with identity verification. For example, when a new person enrolls with a provider of a positive identification system of the type described herein, an initial number of transactions should be highly scrutinized. Thus, upon enrollment, a relatively low identification quality score may be assigned to a series of account numbers corresponding to those "owned" by the new enrollee and enrolled in the system.

There may be predetermined, additional identification measures required if a particular identification quality score associated with an account falls below certain threshold levels. For example, during the first month of an individual's enrollment in the system, the quality score may be at a level where a store clerk is required to request at least one additional photographic identification card from a store patron. Of course, as time progresses and an enrollee initiates a number of financial or other transactions where identification is required and none of those transactions are questioned, then an individual identification quality score may be upgraded.

On the other hand, an individual identification quality score may also be reduced or degraded based on a number of factors. For example, if an enrollee or a merchant questions one or more financial transactions that were initiated using one or more of an enrollee's accounts, then the identification quality score associated with those accounts may be reduced to a level where heightened identification scrutiny is required.

Of course the maintenance of the identification quality score database may be partially or totally automated. For example, the system may be designed to upgrade or degrade individual quality scores based on predetermined transactional situations, such as a number of transactions completed without raising any questions or the occurrence of a questioned transaction. Other identity based fraud indicators may be designed into the system as well, such as an individual enrolling an abnormally large number of accounts with the system in a short period of time or a large number of accounts under different names using a common address. These types of automated checks are especially suited to large scale databases running on high speed computers.

In addition to retrieving identification information units and identification quality scores stored at the remote database site, the database site would be configured to allow input/output controller 13 to initiate additional information requests from outside information databases. One such scenario envisioned in the credit card processing example would be for the database site to query any one of a number of existing credit authorization agencies (CAA) to verify that the credit card account being processed is valid and within its pre-approval credit limit. An alternate embodiment would be to have the remote database storage and retrieval site(s) co-located at a one or more CAA sites.

Thus, a system user, who would be the sales clerk in a retail establishment, would only need to input the credit card information into one device and would receive both credit approval and identification information from a single source. In this scenario, input/output controller 13 would initiate a credit authorization request to and outside CAA through modem bank 14 over public access telephone lines 12 or through a WAN connection 14' over wide area network 12' or the like. If the amount of the transaction is approved by the CAA, the database site would receive the credit approval code from the CAA and retransmit the code to the point of verification terminal along with the digital image information or other unique data over its established communications link. The credit approval code would be displayed either on the display means 6 of the point of verification terminal or, in the alternative, on an optional second display means 6'.

The point of identification terminal receives identification information units and credit approval information requested from outside services via modem 8, WAN device 8' or wireless transceiver 8" and routes the information to controller 7, which would process the information received and display the identification information unit, such as a digital photographic image, received on display device 6.

In one embodiment of the invention, the identification information units are stored at the remote database storage site in a compressed state and are transmitted to the point of identification terminal in the compressed state so as to minimize the time associated with a particular transaction. In this embodiment, the controller 7 first decompresses the received identification information units and then displays the information units on the display device 6.

Another embodiment of the invention, which would be used for situations where the highest security of information would be required, such as when a wireless, mobile identity verification terminal accesses the remote database site over cellular telephone links, the identification information units are encrypted in addition to being compressed for transmission to the point of verification terminal. In this embodiment, the terminal controller 7 is required to decrypt as well as decompress the identification information units in order to allow the information to be displayed on the display device 6.

Likewise, the identification quality score associated with each retrieved identification information unit will be transmitted to the point of identification terminal via the same communications link established between the point of identification terminal and the remote database site. An identification quality indicator, which may be the identification quality score or a derivative thereof will also be displayed on the point of identification terminal display device 6.

In one embodiment, the identification quality indicator comprises a system user command, which is displayed on the point of identification terminal display device. The command may be generated either at the remote database site of it may be generated at the point of identification terminal using an algorith that accepts, as its input, an identification quality score. System user commands may indicate user action steps, such as "process the transaction", "deny the transaction" or "require additional identifying information from the person being identified".

An exceptionally low identification quality score may generate an identification quality indicator comprising a message alerting the clerk that the particular transaction being processed is highly likely to be a fraudulent transaction. In this case an "alert store security" command may by displayed on the point of identification terminal. The alert security command may be encoded so that the individual initiating the potentially fraudulent transaction is not immediately alerted, in which case, he or she may flee the store prior to security personnel reaching the terminal. This would eliminate the possibility of errors on the part of store clerks associated with improper score translations.

The system may further be augmented to configure the point of identification terminal to transmit an alert security signal directly to the store security office automatically if an identification quality score is received that falls below a predetermined threshold. Of course, the thresholds, as well as the specific requirements when thresholds are passed can be defined and redefined by system administrators as the need arises.

Once the retrieved digital photographic image(s) and the identification quality score(s) or derivatives thereof associated with the retrieved image(s) are displayed at the point of identification terminal, the store clerk, or other person responsible for identity verification, would visually compare the image(s) displayed on the display means with the physical appearance of the person being identified at the point of identification terminal. If a match exists, then the clerk would input a specified key or keystroke sequence on input keypad 5 to indicate that the clerk, in fact, verified that an identity match exists.

In more sophisticated embodiments of the invention, the biometric comparison may be accomplished using an automated comparison system, such as those well known in the art, to analyze and compare such biometric as fingerprints, retinal images or the like. In these embodiments, the clerk verification input may not be required. However, in the case where the automated biometric comparison system does not result in an approved match or when the identification quality score associated with the retrieved image indicates that additional, human identification steps or methods are required, then the system will require a clerk verification input after the supplemental identification comparison steps are satisfactorily completed.

In more general terms, for those situations where positive identification of an individual is required but is not associated with a non cash-based financial transaction, such as the credit card transaction described above, a person being identified at a point of identification terminal presents a first identification information unit to an identifier at the point of identification terminal. The first identification unit may be any form of identification, which assigns an identification number to the individual, such as a drivers' license number, a social security number or the like.

The identifier present at the point of identification terminal would then input the first identification information unit, such as the identification number, into the point of identification terminal in any of the manners described above. The point of identification terminal would then initiate communications with the remote database site as was discussed in more detail earlier and transmit the input first identification information unit to the remote database site.

The remote database site would then access the identification information unit database maintained therein and retrieve at least one second identification information unit corresponding the received first identification information unit. The remote identification database will preferably include at least one second identification information unit mapped to each first identification information unit stored therein.

When the second identification information unit(s) are retrieved from the identification database, the system will then access the identification quality score database, which is also maintained at the remote database site, and retrieve the identification quality score(s) assigned to the retrieved second identification information unit(s). As can be appreciated, since more than one second identification information unit may be mapped to a single first identification information unit, the system is preferably designed to assign an identification quality score to each second identification information unit rather than the first. However, since each second identification unit is mapped to a first identification information unit, each identification quality score will necessarily be mapped to a first identification information unit.

Both the retrieved second identification information unit(s) and the retrieved identification quality score(s) or a derivative thereof, such the operator commands described above, will then be transmitted to the positive identification terminal where they will be displayed on the positive identification terminal display. The identifier present at the point of identification will then compare the displayed second identification information unit with a corresponding second identification information unit physically presented by the person being identified at the point of identification. If a match exists, the identifier will so indicate the same by entering a keystroke sequence into the point of identification terminal as described above.

The identifier present will also review the displayed identification quality score or the derivative thereof associate with the second identifying information unit displayed and apply heightened scrutiny in comparing the same with the physically presented second identifying information unit if the displayed identification quality score or derivative so dictates.

Figure 5:
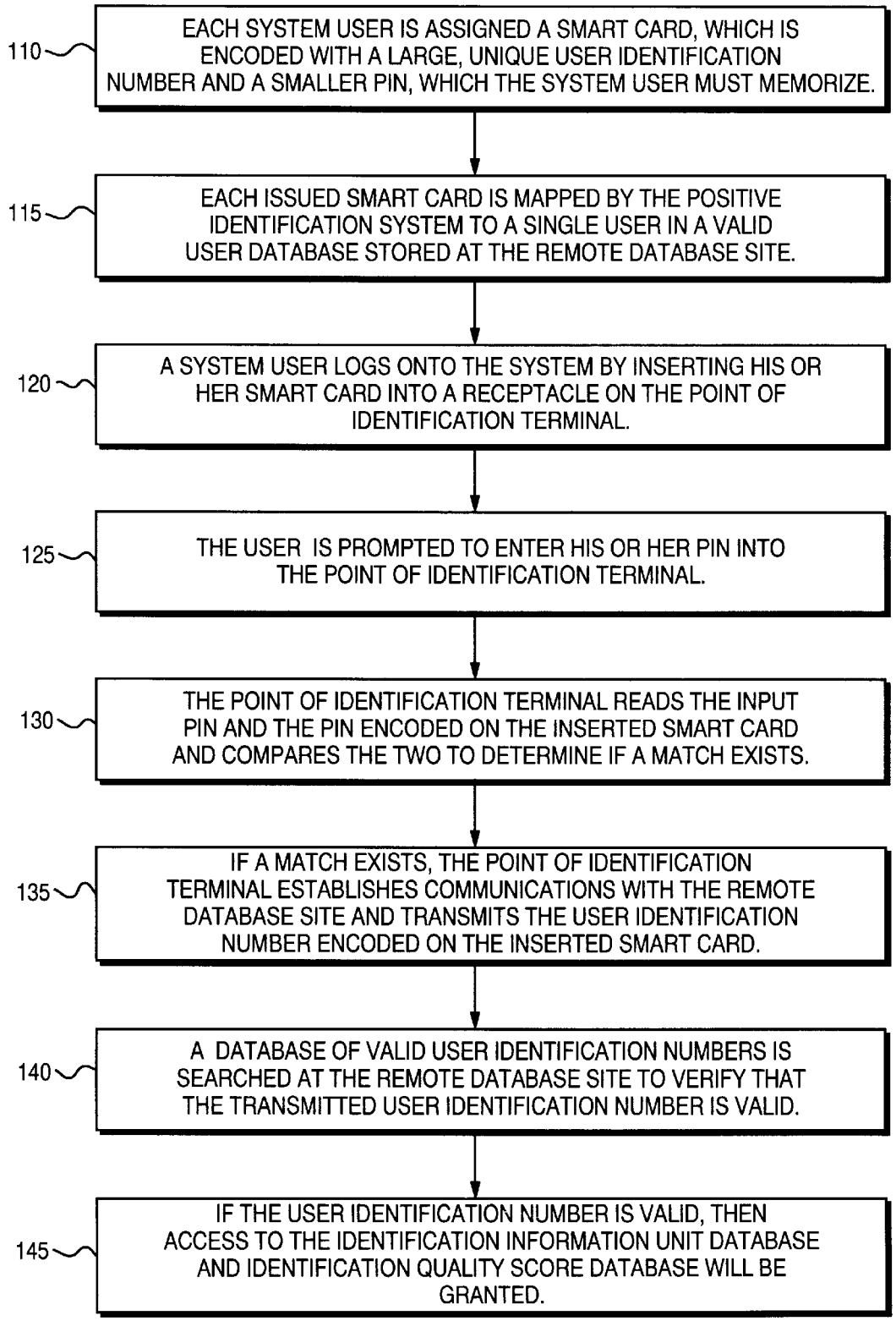
FIG. 5 is a block diagram showing a system user log-on method, which requires a system user to input a smart card including a large, unique user identification number and memorized personal identification number (PIN) into the positive identification terminal in order to gain access to the remote database site in order to verify each transaction.

FIG. 5 shows a positive identification system log on method 100 which uses a combination of a smart card and a memorized personal identification number (PIN) for each individual tasked with verifying the identity of a person (an "identifier"). First, each identifier or system user is assigned a smart card, which is encoded with a large, unique user identification number and a smaller personal identification number (PIN), step 110. Thus, each smart card issued will be unique to a single user. The PIN is a smaller number that is easier for a system user to memorize.

The smart card, in combination with the memorized PIN serve as an access authority information unit, which will allow only authorized users to access the identification information unit and identification quality score databases, which are stored at the remote database site. Each issued smart card is therefore mapped by the positive identification system to a single user in a valid user database, which is also located at the remote database site, step 115. When a user logs into a point of identification terminal in order to access the information maintained in the remote database, the user will insert his or her smart card into a receptacle on the point of identification terminal, step 120. The point of identification terminal will then prompt the system user to enter his or her PIN into the point of identification terminal using the terminal keypad, step 125. The terminal will then read the input PIN, as well as the PIN encoded on the inserted smart card and compare the two, step 130. If a match exists, then the point of identification terminal will query the remote database site and transmit the encoded user identification number to the remote database site, step 135. At the remote database site, a search of a valid user database will be performed to ensure that the particular smart card is assigned to a valid system user, step 140. If it is, then access to the remote databases containing identification information units and identification quality scores will be granted, step 145. If either the PIN comparison does not result in a match or the user identification number encoded on the inserted smart card is not assigned to a valid database user, then access will be denied.

Once access is granted, the clerk is free to accept a form of payment from a person to be identified, such as a credit card, a check or the like. Upon receipt of the form of payment, the clerk inputs the account information into the point of identification terminal and the positive identification process continues as described above. The remote database site will store the user identification number encoded on the user's smart card along with the data associated with the specific transaction as a transaction record. Thus, if there is ever a question as to the veracity of the identification process, the system can recreate a transaction and identify not only the person initiating the transaction but the clerk who was responsible for positively identifying the individual initiated the transaction.

In addition, the system could be configured to incorporate an off-line fraud detection routine to monitor transaction patterns in order to identify out of norm fraud patterns. An example of such a routine would be for the system to note the time differential between transactions authorized by a specific system user and decide if it would be unlikely for the system user assigned to the smart card to have physically moved between the different point of identification terminals in order to have authorized the transactions. For instance, if the same user identification number were forwarded to the remote database site from different point of identification terminals at different locations at nearly the same time, the system could highlight the transactions as being potentially fraudulent and thus requiring additional investigation.

Thus, the above described systems of using access authority information units to gain access to the positive identification system would solve the problems associated with open, unsecured and unauditable access to data for use in the point of use identifiction systems.

Figure 6A:
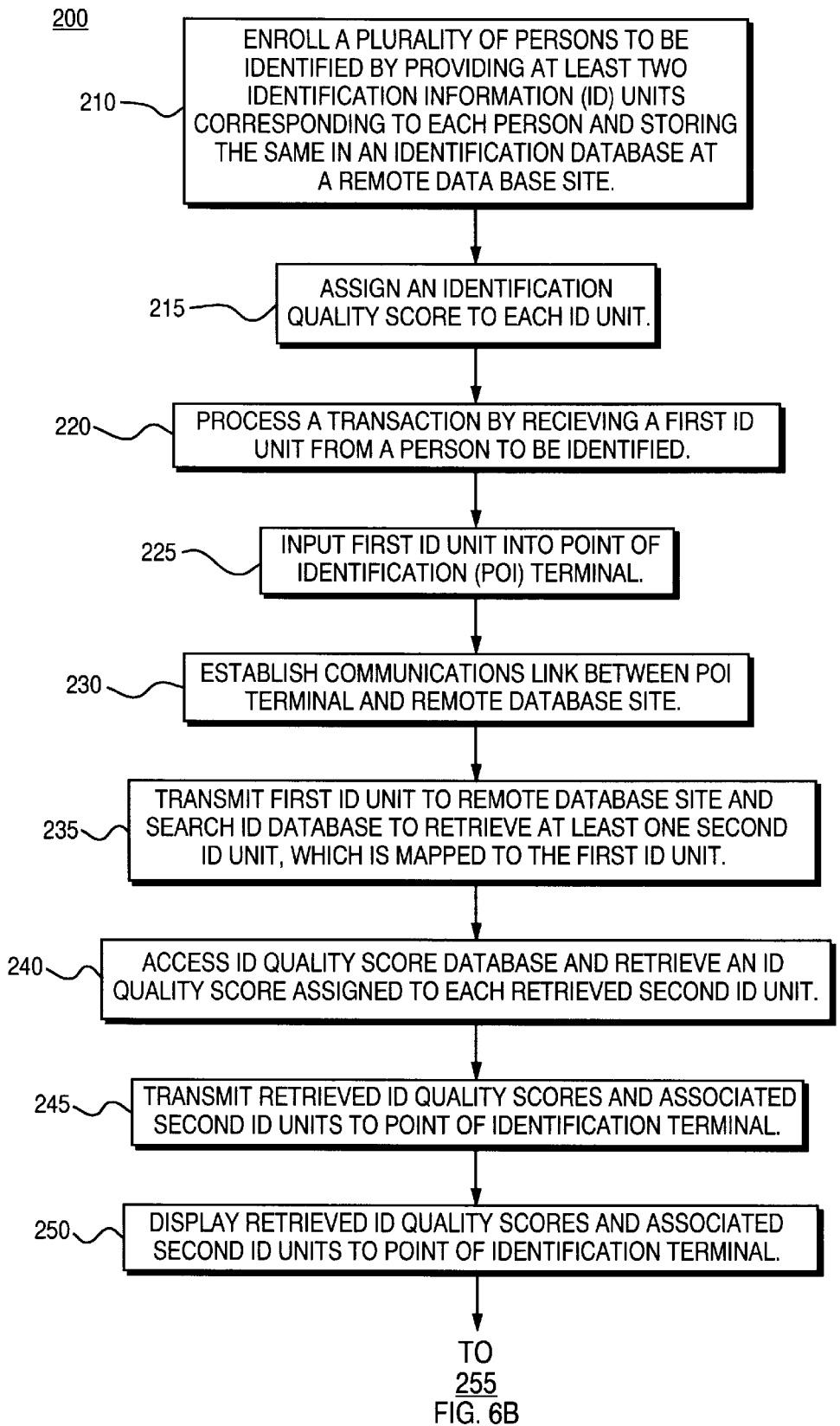
FIGS. 6A and 6B are a flow chart showing a method of assessing the quality of an identification transaction utilizing an identification quality score.
Figure 6B:
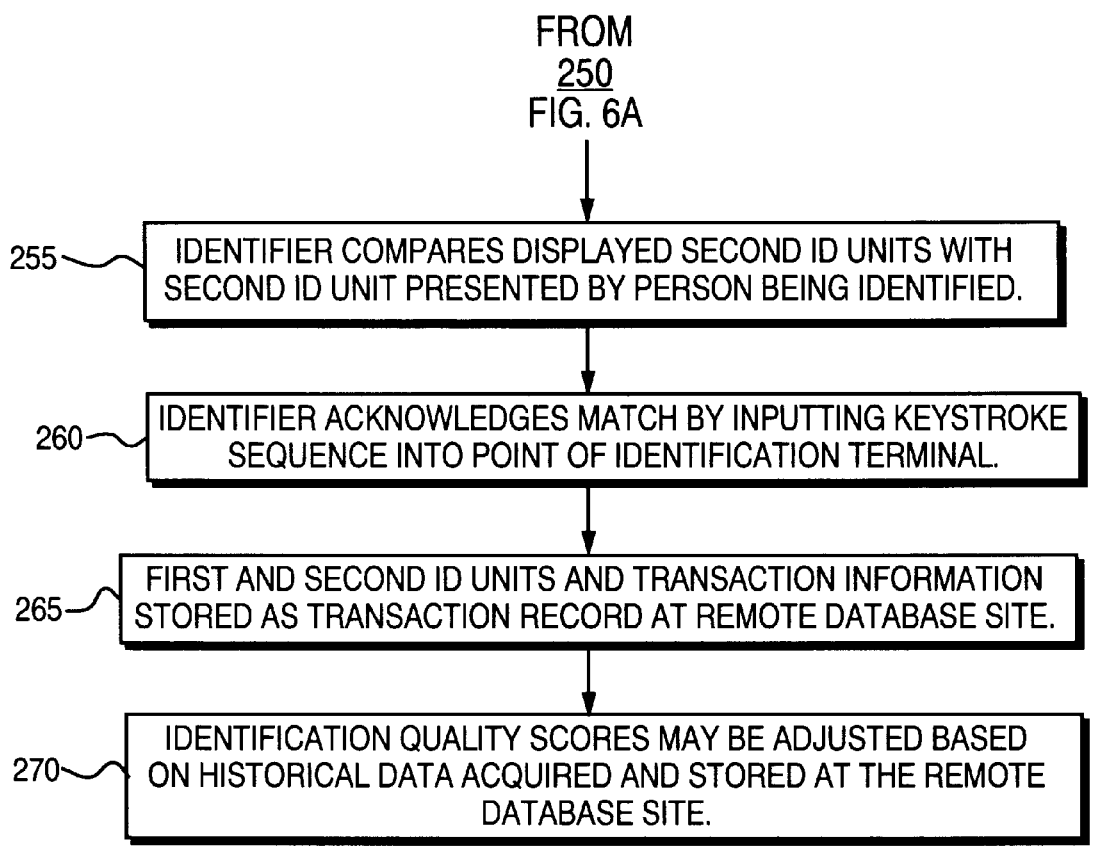

A method 200 of assessing the quality of a particular identification transaction using an identification quality score according to the teachings of the present invention is shown in FIG. 6. The method begins by enrolling a plurality of persons to be identified using a positive identification system by providing at least two identification information units corresponding to each person enrolling with said system and storing the identification information units in an identification database at a remote database site, step 210. Upon enrollment, each identification information unit will be assigned an initial identification quality score, step 215, which will be indicative of an untested identification information unit. In other words, the initial identification quality score will be relatively low.

An identification transaction will then progress as follows. A person to be identified will provide a first of the at least two identification information units that were provided to the remote identification database to the identifier present at the point of identification, who will accept the first identification information unit, step 220. The identifier will then input the first identification information unit into a point of identification terminal at the point of identification, step 225.

Next, a communications link will be established between the point of identification terminal and the identification database located at the remote database site, step 230. Once the communications link is established, the point of identification terminal will transmit the input first identification information unit to the remote database site, where the identification database will be searched and at least one second identification information unit that is mapped to the received first identification information unit will be retrieved, step 235.

The remote database site will then access the identification quality score database and retrieve an identification quality score assigned to each second identification information unit retrieved from the identification database, step 240.

Both the retrieved second identification information unit (s) and the retrieved identification quality scores assigned thereto will then be transmitted over the established communications link to the point of identification terminal, step 245, where they will be displayed on the point of identification terminal display, step 250. The identifier will then compare the displayed second identification information unit(s) with a corresponding second identification information unit physically presented to the identifier by the person to be identified at the point of identification, step 255.

If a match exists between at least one of the displayed second identification information units and at least one corresponding second identification information unit physically presented by the person being identified, then the identifier will acknowledge the match by inputting a key sequence into the point of identification terminal, step 260. Both the first and second identification information units and transaction information will be stored as a transaction record at the remote database site for retrieval at a later date, should a particular transaction be questioned, step 265.

Finally, each stored identification quality score may be adjusted based on historical data acquired and stored at the remote database site, step 270. Scores may be adjusted either up or down depending on the specifics of the historical data, as described in more detail above. The second identification information units are preferably biometric identifiers associated with persons being identified. The preferred biometric identifiers include digital photographic images of those persons to be identified.

Figure 4:
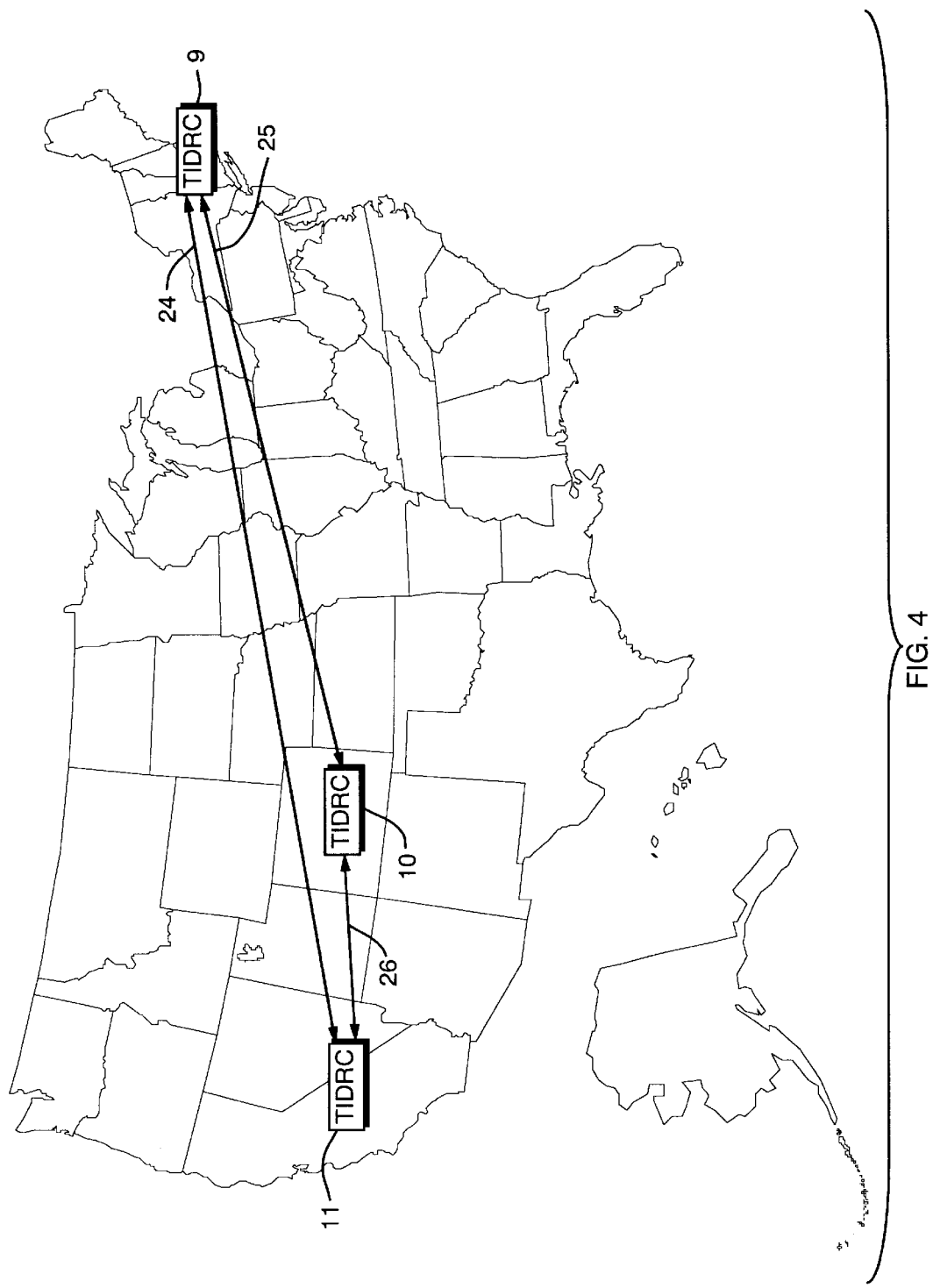
FIG. 4 is an upper level system architecture drawing showing a number of database storage and retrieval centers networked over a global high speed network.

Multiple remote database storage and retrieval centers would be tied together via a global high speed network 24–26 (FIG. 4). Data from any of the database centers can be routed to any of the other centers over the network in order to update the databases, provide redundancy of data, emergency backup, load monitoring and transactional balancing.

Because the disclosed invention can be used without alteration of any substantial kind to the present credit card system, as seen from the perspective of a current credit card user, novel methods will be used to develop the digital photographic image database. Alternative methods of developing the database are disclosed in U.S. Pat. No. 5,657,339, issued Aug. 12, 1997 and assigned to the assignee of this invention, which is incorporated herein by reference.

Various changes coming within the spirit of the invention may suggest themselves to those skilled in the art; hence the invention is not limited to the specific embodiment shown or described, but the same is intended to be merely exemplary. It should be understood that numerous other modifications and substitutions can be devised by those skilled in the art that will fall within the spirit and scope of the principles of the invention and such modifications and substitutions are considered to be within the scope of the present invention which is not to be limited except by the claims which follow.

What is claimed is:

1. A method of assessing the quality of an identification transaction, said method comprising the steps of:

enrolling a plurality of persons to be identified by providing at least two identification information units corresponding to each said person and storing said identification information units in an identification database at a remote database site;

assigning an identification quality score to each said identification information unit and storing each identification quality score in an identification quality score database at said remote database site;

accepting a first of said at least two identification information units from a person to be identified at a point of identification;

inputting said first of said at least two identification information units into a point of identification terminal;

establishing a communications link between said point of identification terminal and said identification database;

transmitting said first of said at least two identification information units from said point of identification terminal to said identification database;

searching said identification database and retrieving at least a second of said at least two identification information units, said at least a second of said at least two identification information units mapped to said first identification information unit in said identification database;

searching said identification quality score database and retrieving said identification quality score assigned to each said retrieved second identification information unit;

transmitting each said second identification information unit and said identification quality score associated therewith to said point of identification terminal over said communications link;

displaying each said second identification information unit and an identification quality indicator associated with each received identification quality score on a display at said point of identification terminal;

reviewing the identification quality indicator to determine the level of scrutiny to apply to said identification transaction;

comparing each said displayed second identification information unit with a corresponding second identification information unit physically presented by the person being identified at said point of identification;

acknowledging the positive identification of said person being identified if a match exists between at least one of said displayed second identification information units with said corresponding second identification information unit physically presented by the person being identified;

storing at least said first and second identification information units along with transaction information as transaction record; and adjusting said identification quality score stored in said identification quality database based on historical data acquired and stored at said remote database site.

2. The method of assessing the quality of an identification transaction as claimed in claim 1, wherein said step of adjusting said identification quality score comprises lowering said identification quality score if transactions are questioned at a later date.

3. The method of assessing the quality of an identification transaction as claimed in claim 1, wherein said step of adjusting said identification quality score comprises raising said identification quality score after a number of identification transactions have occurred and none of said transactions are questioned at a later date.

4. The method of assessing the quality of an identification transaction as claimed in claim 1, wherein said step of adjusting said identification quality score comprises lowering said identification quality score if at least one identification transaction does not result in a match existing between said displayed identification unit and said corresponding identification unit physically presented by the person being identified.

5. The method of assessing the quality of an identification transaction as claimed in claim 1, wherein said step of displaying each said identification quality indicator comprises generating a system user message based on each said received identification quality score and displaying each said system user message on said point of identification terminal display.

6. The method of assessing the quality of an identification transaction as claimed in claim 1 further comprising the step of transmitting an alert message to said point of identification terminal if said identification quality score corresponding to at least one identification information unit retrieved from said identification quality score database is below a threshold score.

7. The method of assessing the quality of an identification transaction as claimed in claim 6, wherein said alert message is encoded so that it is identifiable as such by a system user and is not identifiable as such by a person being identified.

8. The method of assessing the quality of an identification transaction as claimed in claim 1, wherein said step of enrolling a plurality of persons to be identified by providing at least two identification units corresponding to each said person comprises providing at least one biometric identifier associated with each said person to be identified.

9. The method of assessing the quality of an identification transaction as claimed in claim 8, wherein said at least one biometric identifier comprises a digital photographic image of each said person to be identified.

10. A method of assessing the quality of an identification transaction, said method comprising the steps of:

enrolling a plurality of persons to be identified by providing at least two identification information units corresponding to each said person and storing said identification information units in an identification database at a remote database site;

assigning an identification quality score to each said identification information unit and storing each identification quality score in an identification quality score database at said remote database site;

accepting a first of said at least two identification information units from a person to be identified at a point of identification;

inputting said first of said at least two identification information units into a point of identification terminal;

establishing a communications link between said point of identification terminal and said identification database;

transmitting said first of said at least two identification information units from said point of identification terminal to said identification database;

searching said identification database and retrieving at least a second of said at least two identification information units, said at least a second of said at least two identification information units mapped to said first identification information unit in said identification database;

searching said identification quality score database and retrieving said identification quality score assigned to each said retrieved second identification information unit;

generating a system user command for each said retrieved identification quality score and linking each said system user command to its associated second identification information unit;

transmitting each said second identification information unit and associated system user command to said point of identification terminal over said communications link;

comparing each said received second identification information unit with physical information presented by said person being identified and determining whether a match exists between said physical information presented and at least one of said received second identification information units;

displaying said system user command associated with at least one second identification information unit on a display at said point of identification terminal;

complying with the displayed system user command;

storing at least said first and second identification information units along with transaction information as a transaction record; and adjusting said identification quality score stored in said identification quality database based on historical data acquired and stored at said remote database site.

11. A method of assessing the identity of a person initiating a non cash-based financial instrument transaction comprising the steps of:

accepting a non cash financial instrument from a person initiating said non cash-based financial transaction, said non cash-based financial instrument including an account number identifying a financial account from which funds necessary to complete said non cash-based financial transaction may be drawn;

inputting said account number into a point of identification terminal;

establishing a communications link between said point of identification terminal and a remote database site, said database site having stored therein an identification database comprising a plurality of identification information units, each said identification information unit mapped to at least one account number, said identification information units corresponding to persons authorized to initiate financial transactions using said financial account, each said identification information unit further having an identification quality score associated therewith, said identification quality scores stored in an identification quality database at said remote database site;

transmitting said account number from said point of identification terminal to said remote database site over said communications link;

searching said identification database and retrieving at least one identification information unit stored in said identification database, which is mapped to said transmitted account number;

searching said identification quality score database and retrieving said identification quality score assigned to each said retrieved identification information unit;

transmitting each said retrieved identification information unit and each said retrieved identification quality score assigned thereto to said point of identification terminal over said communications link;

displaying each said transmitted identification information unit and an identification quality indicator on a display at said point of identification terminal;

comparing each said displayed identification information unit with a corresponding identification information unit physically presented by the person being identified at said point of identification and reviewing said displayed identification quality score to identify non cash-based financial transactions where heightened identification scrutiny is required;

acknowledging the positive identification of said person being identified if a match exists between at least one of said displayed identification information units and said corresponding identification information unit physically presented by the person being identified;

storing said displayed, matching identification information unit along with transaction information as a transaction record; and adjusting said identification quality score stored in said identification quality score database based on historical data acquired and stored at said remote database site.

12. The method of assessing the identity of a person initiating a non cash-based financial instrument transaction as claimed in claim 11, wherein said displayed identification quality indicator comprises a system user command generated by said point of identification terminal in response to said received identification quality score assigned to said displayed, matching identification information unit.

13. The method of assessing the identity of a person initiating a non cash-based financial instrument transaction as claimed in claim 11, wherein said plurality of identification information units stored in said remote identification database comprise biometric identifiers associated with persons authorized to draw funds from specified financial accounts.

14. The method of assessing the identity of a person initiating a non cash-based financial instrument transaction as claimed in claim 13, wherein said biometric identifiers comprise digital photographic images of persons authorized to draw funds from specified financial accounts.

15. The method of assessing the quality of an identification transaction as claimed in claim 11 further comprising the step of transmitting an alert message to said point of identification terminal if at least one of said retrieved identification quality scores corresponding to a retrieved identification information unit is below a threshold score.

16. The method of assessing the quality of an identification transaction as claimed in claim 15, wherein said alert message is encoded so that it is identifiable as such by a person operating said identification terminal and is not identifiable as such by said person initiating said non cash-based financial transaction.

17. A method of assessing the identity of a person initiating a non cash-based financial instrument transaction comprising the steps of:

accepting a non cash financial instrument from a person initiating said non cash-based financial transaction, said non cash-based financial instrument including an account number identifying a financial account from which funds necessary to complete said non cash-based financial transaction may be drawn;

inputting said account number into a point of identification terminal;

establishing a communications link between said point of identification terminal and a remote database site, said database site having stored therein an identification database comprising a plurality of identification information units and an identification quality score database comprising a plurality of identification quality scores, wherein each said identification information unit is mapped to at least one account number, said identification information units corresponding to persons authorized to initiate financial transactions using said financial account and wherein each identification quality score is mapped to a corresponding identification information unit;

transmitting said account number from said point of identification terminal to said remote database site over said communications link;

searching said identification database and retrieving at least one identification information unit stored in said identification database, which is mapped to said transmitted account number;

searching said identification quality score database and retrieving said identification quality score assigned to each said retrieved identification information unit;

generating an identification quality indicator for each retrieved identification quality score assigned to each said retrieved identification information unit;

transmitting each said retrieved information unit and each said generated identification quality indicator assigned thereto to said point of identification terminal over said communications link;

comparing each said received identification information unit with a corresponding identification information unit physically presented by the person being identified at said point of identification and determining if a match exists between at least one received identification information unit and said physically presented identification information unit;

displaying at least said identification quality indicator associated with said received identification information unit corresponding to said identification information unit physically presented by the person being identified on a point of identification terminal display;

reviewing said displayed identification quality indicator to identify non cash-based financial transaction where heightened identification scrutiny is required; and storing said matching identification information unit along with transaction information as a transaction record.

18. The method of assessing the quality of an identification transaction as claimed in claim 17 further comprising the step of adjusting said identification quality score stored in said identification quality score database based on historical data acquired and stored at said remote database site.

19. The method of assessing the quality of an identification transaction as claimed in claim 17, wherein said step of generating an identification quality indicator for each retrieved identification quality score assigned to each said retrieved identification information unit comprises generating a system user command based on each said retrieved identification quality score, each said system user command tailored to instruct a system user as to the level of scrutiny to apply to a particular identification transaction.

20. A system for assessing the quality of an identification transaction comprising:

a remote database site having stored therein an identification database, including a plurality of identification information units corresponding to a plurality of persons to be identified, at least two identification information units corresponding to each said person, and an identification quality score database, including an identification quality score assigned to each identification information unit stored in said identification database;

a point of identification terminal including an input device configured to input a first identification information unit received from a person to be identified at said point of identification terminal, said first identification information unit corresponding to at least one of said plurality of identification information units stored in said identification database at said remote database site, said point of identification terminal further including a display device for displaying at least a second identification information unit and an identification quality score assigned thereto; and a means for communicating between said point of identification terminal and said remote database site to allow said identification information units and identification quality scores to be transmitted therebetween.

21. The system for assessing the quality of an identification transaction as claimed in claim 20, wherein at least one of said at least two identification information units corresponding to each person being identified comprises a biometric identifier associated with said person.

22. The system for assessing the quality of an identification transaction as claimed in claim 21, wherein said biometric identifier comprises a digital photographic image of said person.

* * * * *